Jan. 5, 1960 G. BOULET 2,919,719
SHOCK-ABSORBER DEVICE FOR PNEUMATIC SUSPENSION OF VEHICLES
Filed July 24, 1957
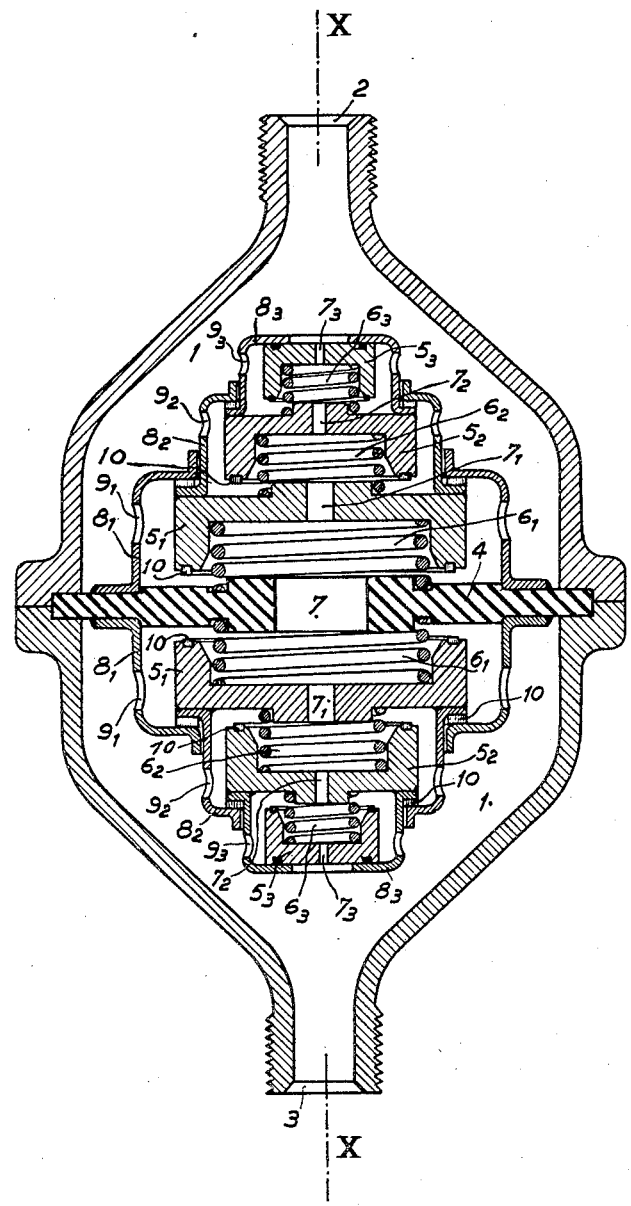

2,919,719
SHOCK-ABSORBER DEVICE FOR PNEUMATIC SUSPENSION OF VEHICLES

Georges Boulet, Toulouse, France, assignor to Societe a Responsabilitee Limitee Recherches Etudes Production R.E.P., Paris, France, a company of France Application July 24, 1957, Serial No. 673,838
Claims priority, application France August 1, 1956
4 Claims. (Cl. 138—43)

This invention relates to energy absorbing and dissipating devices.

The invention has for an object the provision of an improved shock-absorber or damping device more generally intended for the pneumatic suspension of vehicles, and particularly but not exclusively intended for monochronous suspensions with the object of damping the large amplitudes of frequencies of suspension.

These large amplitudes may result either from shocks or from large accelerations caused, for example, by the profile of a track on which a vehicle is moving.

In any case, it is difficult to obtain on a vehicle which is moving either along a road or along a railway track, constant speeds of upward and downward movement of the wheels and consequently, zero acceleration.

A shock-absorber device provided by the present invention is proposed in order to obtain such a result.

In accordance with the invention, there is provided a body fixed to the chassis of a vehicle, the internal chamber of which is put into communication at one of its extremities with the bellows of the pneumatic suspension of the vehicle and, at its opposite extremity, with auxiliary chambers which are selectively placed in communication with the bellows, depending on the variation of the volume of air contained in the said bellows.

The apparatus further comprises essentially in its central portion, a diaphragm having a central orifice and, on each side of said diaphragm, a series of masses urged by springs, each of these masses having a calibrated central orifice and being limited, in its movement along a direction at right angles to the plane of the diaphragm by an abutment cage carried by the preceding mass, the diaphragm itself carrying the first abutment cage.

One form of shock-absorber device provided in accordance with the invention is shown by way of example in the sole figure of the accompanying drawing, which figure is a view in longitudinal axial cross-section.

The device is composed of a shock-absorber body 1 having an axis X—X, mounted on the chassis of the vehicle and having an internal space which is connected at its extremity 2 to the bellows of the suspension, and at its opposite extremity 3 to the auxiliary chambers.

At the central part of the body 1 is fixed a diaphragm 4 and, on each side of this diaphragm, a series of masses or weights $5_1, 5_2, 5_3 \ldots 5_n$ respectively engaged by calibrated springs $6_1, 6_2, 6_3 \ldots 6_n$.

Each of these weights is limited in its movement along the axis X—X by a thrust-cage $8_1, 8_2, 8_3 \ldots 8_n$; calibrated orifices 7, $7_1, 7_2, 7_3$ are formed both on the diaphragm 4 and on each of the weights $5_1, 5_2, 5_3$; at the periphery of each of the thrust cages 8 are formed orifices $9_1, 9_2, 9_3$ which are uniformly spaced around the periphery of the cages. Resilient seals 10 are provided between the elements.

The operation of the device is as follows:

Under the action of vertical accelerations, the weights $5_1, 5_2, 5_3$ compress their associated spring 6 in the direction which corresponds to that of the acceleration in action. If this acceleration is sufficient, the said weights come into contact, one with the diaphragm 4 and each of the following against that preceding.

By choosing, in a suitable manner, the number and the value of each of the masses or weights, and also the calibration of the corresponding springs and the calibration of the various orifices 7, it is possible to obtain the damping desired for each of the two directions of operation of the members of the suspension.

The device is simple and inexpensive. It may be made practically silent, for example, by making its internal parts, and especially the thrust-cages, of plastic or elastic material, or by the interposition of abutments 10 fixed on the members.

This device can be employed for any direction of the accelerations such as transverse, longitudinal, etc. It is also suitable if the medium transferred is a liquid, and is applicable to any type of suspension in general and also to any system which requires damping.

It will be understood that the device is variable in construction such as regards the masses or weights, the means employed to restore their positions, the limitation of their travel, etc.

The invention is especially applicable to the monochronous pneumatic suspension disclosed in my co-pending application No. 673,837, filed July 24, 1957 for "Pneumatic Monochronous Suspension for Vehicles."

What I claim is:

1. An oscillation damping device for the fluid suspension of a vehicle comprising a hollow substantially closed body having spaced ends and adapted to be coupled at said ends to the fluid suspension of the vehicle, a rigid centrally apertured diaphragm having opposite faces and separating the said hollow body into two chambers; on each face of the said diaphragm, a thrust-cage including a first open end fixed to the diaphragm, a smaller open end remote from the diaphragm and a side wall between the latter said ends and having at least one orifice on the periphery thereof, a centrally apertured movable mass in each thrust-cage having a limited displacement therein, a spring urging each mass away from the diaphragm, a series of further similar thrust-cages each having a first open end communicating with the smaller open end of the cage next closest to the diaphragm and engaging the mass next closest to the diaphragm and a smaller open end remote therefrom, a further centrally apertured mass in each further thrust-cage and a spring urging each further mass away from the mass next closest to the diaphragm.

2. A damping device as claimed in claim 1 wherein the cages have cylindrical side walls and, on opposite sides of the diaphragm are telescopically mounted one within the other, the side walls of the cages sliding inside the smaller open ends of the cages next closest to the diaphragm.

3. A damping device as claimed in claim 2 wherein the cylindrical wall of one cage slides inside the smaller open end of the cage next closest to the diaphragm and comprising flanges extending outwardly from the first open end of each cage and cooperating with the cage next closest to the diaphragm to limit relative movement between the cages.

4. A damping device as claimed in claim 3 wherein resilient seals are positioned on the two masses contacting the diaphragm and between the latter and said two masses and further resilient seals are positioned on each further mass.

References Cited in the file of this patent

UNITED STATES PATENTS

| 1,028,400 | Stanton | June 4, 1912 |
| 2,042,462 | Hahn | June 2, 1936 |
| 2,678,066 | Carter | May 11, 1954 |